May 3, 1960
R. DUPONT
2,934,786
ELECTRIC MULTI-PURPOSE VULCANIZING OUTFITS
Filed March 18, 1958
3 Sheets-Sheet 1
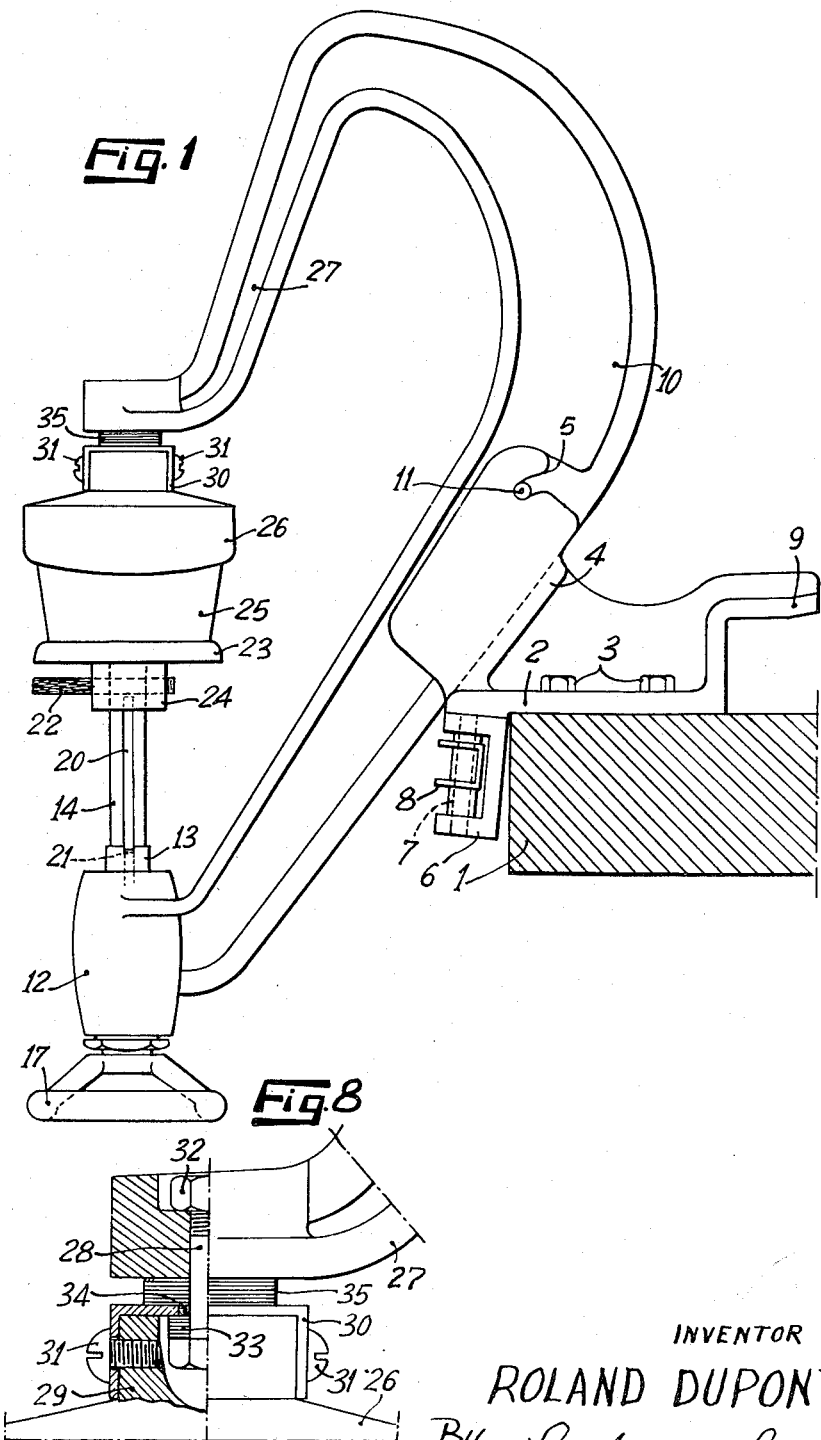
INVENTOR
ROLAND DUPONT
By Linton and Linton
ATTORNEYS

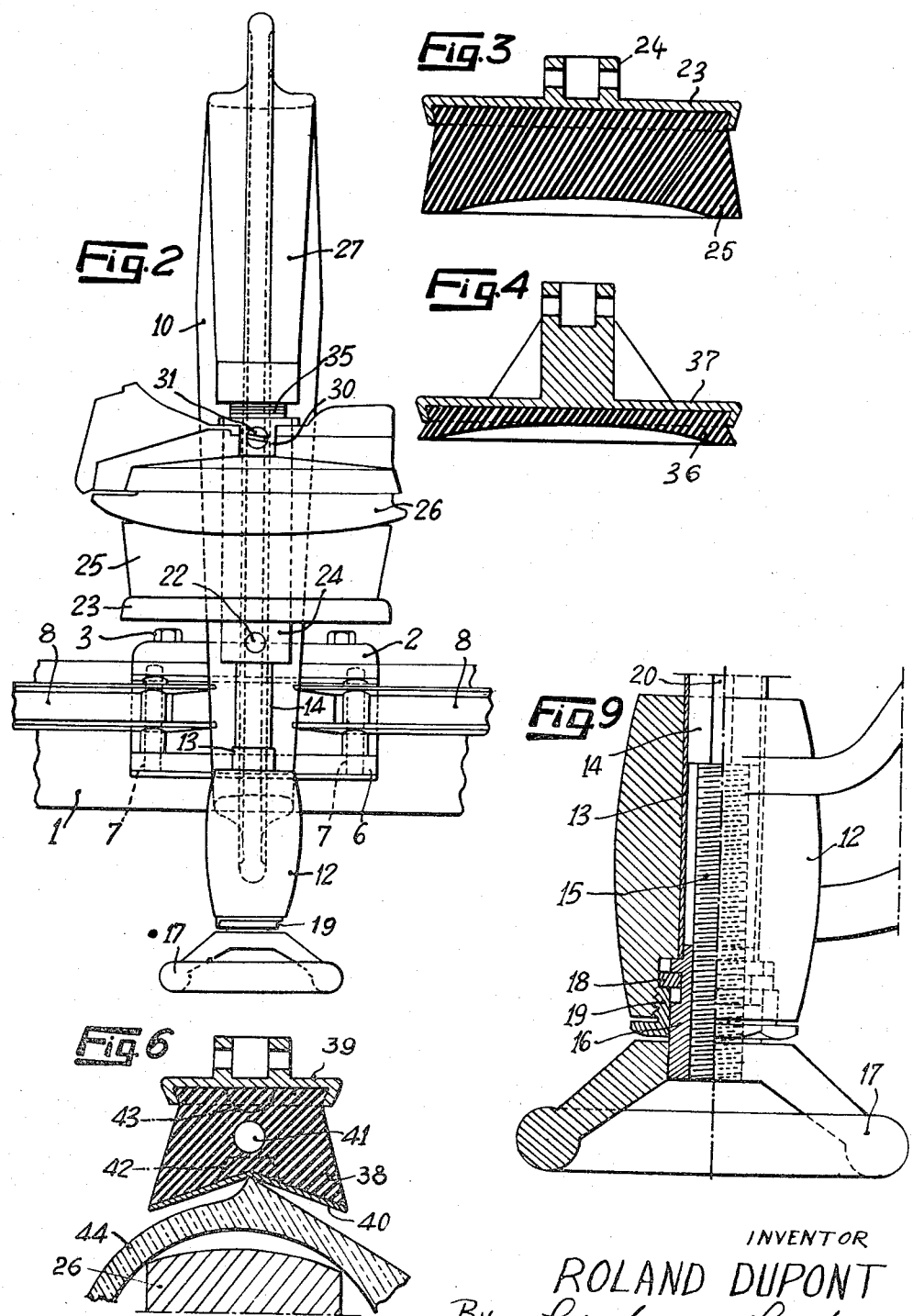

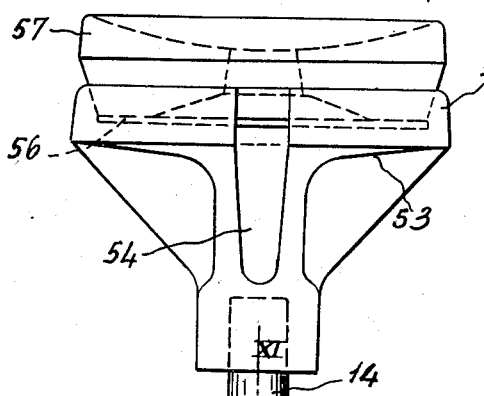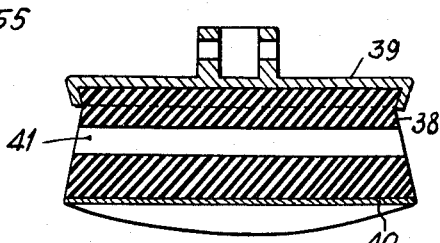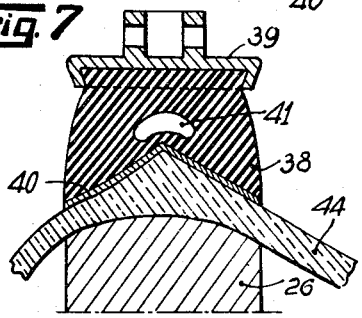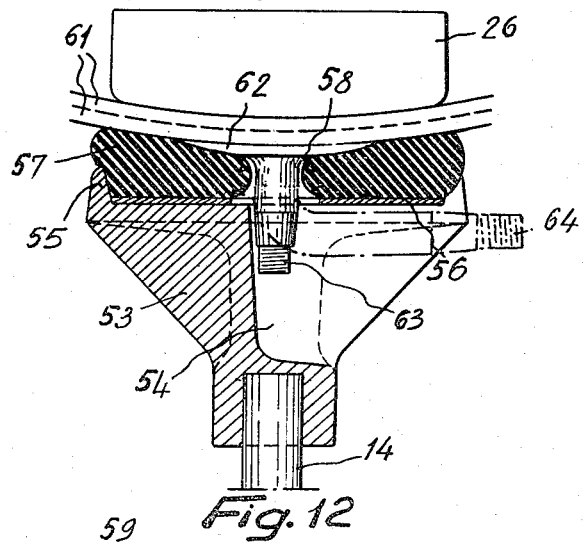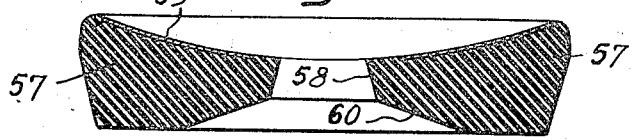

United States Patent Office 2,934,786
Patented May 3, 1960

2,934,786

ELECTRIC MULTI-PURPOSE VULCANIZING OUTFITS

Roland Dupont, Epernay, France

Appplication March 18, 1958, Serial No. 722,170

Claims priority, application France April 16, 1957

1 Claim. (Cl. 18—18)

It is the essential object of this invention to provide a vulcanizing outfit designed for operation either on a stationary support, or in different variable positions for vulcanizing inner and outer tubes as well as articles of various shapes and contours.

The essential feature of the vulcanizing outfit according to this invention is that it comprises a goose-neck member carrying at one end a heat-insulated vulcanizing head and at the other end a movable support adapted to be moved towards or away from the vulcanizing head and to reecive different interchangeable clamping pads selected according to the type of vulcanizing work to be performed.

Another characteristic feature of this invention is that convex or angular-faced articles are vulcanized by utilizing a compressible resilient bearing pad formed with an inner cavity and lined on its bearing article-engaging surface with a flexible but practically non-extensible fabric coating of which the deformation is adapted automatically under the clamping pressure to apply the complete surface of the pad against the article to be vulcanized.

In order to afford a clearer understanding of the present invention and of the manner in which the same may be carried out in the practice, reference will now be made to the accompanying drawings forming part of this specification and illustrating diagrammatically by way of example a few typical embodiments of the invention. In the drawings:

Figure 1 is a side elevational view showing the vulcanizing outfit according to this invention in its inoperative position on its bench support;

Figure 2 is a front elevational view of the outfit illustrated in Fig. 1;

Figure 3 is a vertical section showing a clamping pad suitable for repairing the tread and side walls of a tyre cover;

Figure 4 is a similar section illustrating a pad provided with its supporting tray for repairing inner tubes;

Figure 5 is a longitudinal section taken along a special pad for repairing tyre covers in the region of the junction between the tread and the side walls;

Figure 6 is a cross-section illustrating the pad of Fig. 5 and the position of a tyre cover before its actual repair;

Figure 7 shows the same elements after the application of the clamping pressure;

Figures 8 and 9 show on a larger scale constructional details of the vulcanizing outfit illustrated in Fig. 1, one half being shown in section and the other half in elevation;

Figure 10 shows an outfit for vulcanizing a valve having a rubber base on an inner tube;

Figure 11 is a vertical section showing the device of Fig. 10 in section taken along the line XI—XI, in its vulcanizing position, and Figure 12 is a vertical axial section showing on a larger scale the resilient pad of Fig. 11.

The support of the vulcanizing outfit according to the present invention is adapted to be mounted on a bench 1 and consists essentially of a base plate 2 adapted to be secured on the bench by means of screws 3 or the like. This base plate 2 is formed with an integral front and upper extension in the form of two parallel vertical plates 4 adapted to receive there between which the neck of the apparatus to be described here-after. In the vicinity of its upper end each vertical plate 4 is formed with an oblique notch 5 for a purpose to be defined presently.

On either side of the vertical plates 4 the base plate 1 carries integral yokes 6 each adapted to support a slightly inclined pin 7 for the pivotal mounting of a folding or collapsible arm 8 adapted to be either folded back laterally against the bench 1 or extended forwards in a slightly raised position until the ends of these arms which are pivoted in the yokes 6 engage and are stopped by the latter. When the two arms 8 are in their extended position away from the bench 1 they constitute a substantially A-shaped and slightly inclined support adapted to receive a tyre so that the latter rests thereon through its side walls. Due to the inclination of the pivot pins of these arms 8, the latters tend to automatically resume by gravity their folded position against the bench when the tyre is removed therefrom. This arrangement reduces the over-all dimensions of the assembly and prevents the operator from hurting himself when walking past the bench. At the rear, the base plate 1 is formed with a hook-like projection 9, so that when a tyre cover has its portion to be repaired disposed on the A-shaped collapsible support 8, its diametrally opposite portion rests on the bench and is prevented from lifting during the vulcanizing operation by the hook-like projection 9 engaging the lower head of the tyre. Under these conditions, the tyre is properly and safely held in position.

Now the detachable and movable vulcanizing outfit according to this invention will be described more in detail; this outfit is adapted to be either carried by the support described hereabove, for example for repairing an inner tube, or utilized separately, for example for repairing a tyre cover carried by the collapsible A support as explained hereinabove.

The main component element of the device is a goose-neck 10 of adequate shape which carries a transverse pin 11 the projecting lateral ends of which are adapted to engage the notches 5 when the goose-neck is disposed between the vertical plates 4 so as to be supported by the base plate 2 (see Figs. 1 and 2). Thus, when it is desired to remove the vulcanizing outfit from its support, the goose-neck is tilted slightly in the clockwise direction (Fig. 1) by pulling its bottom end forwards whereafter the goose-neck is lifted to free the pin 11 from the notches 5. As shown in Figs. 1 and 2 the lower end of the goose-neck is formed with an integral hollow barrel 12 lined internally with a tube 13 in which an actuating rod 14 formed with a screw-threaded lower end 15 is mounted; this threaded end 15 is engaged by a nut 16 rigid with a handwheel 17 and formed with a peripheral annular groove (Fig. 9) adapted to receive a split washer 18 held inside the barrel 12 by a hollow screw 19 engaging the larger and tapped lower end of the bore in the barrel 12 and surrounding the aforesaid nut 16. Thus, the split washer 18 prevents the nut 16 from moving out of the barrel 12 when the nut 16 is rotated so as to move the rod 14 inwards; this rod 14 is formed with a longitudinal groove engaged by a key 21 solid with the tube 13 to prevent the rod 14 from rotating while permitting only the axial displacement thereof when the handwheel 17 and therefore the nut 16 are rotated.

At its end opposite to the handwheel 17, the rod 14 is formed with a transverse hole receiving a transverse pin 22 for mounting on this rod end a pad-carrying tray 23. To this end, the pin 22 extends through a neck portion 24 solid with the tray 23. This tray 23 carries the clamping pad 25 of rubber or equivalent, relatively hard and resilient material, adapted to exert a pressure on the object to be repaired while causing the latter to bear with the maximum surface area against the heating head 26 of any suitable type. This heating head 26 is supported by the goose-neck end opposite to that carrying the barrel 12.

To support this heating head 26 the goose-neck 10 is formed with a depending extension 27 of adequate form having at its lower end a hole for the passage of a fixation bolt 28 (see Fig. 8). The head carries a hollow neck 29 having secured thereon by means of screws 31 a strap 30 suspended from the bolt 28 by a nut 32. The bolt 28 is heat-insulated from the heating head 26 by a plurality of washers 33 of mica or other heat insulating material disposed beneath the strap 30, another insulating washer 34 being disposed between the strap 30 and bolt 28; finally, other insulating members 35 are fitted between the strap 30 and the goose-neck extension 27, as shown. Thus, when the nut 32 is tightened the parts are safely assembled and heat-insulated.

The rubber or like pad 25 illustrated in longitudinal vertical section in Fig. 3 is intended more particularly for repairing the side wall or the tread of a tyre cover; its tyre-engaging surface of generally square, rectangular, round or oval shape is advantageously formed with a concavity which however does not follow the exact convexity of the heating head 26.

The pad 36 illustrated in Fig. 4 is supported by a back plate or tray 37 and adapted more particularly for repairing inner tubes; it may have the same general shape as the preceding pad but its thickness may be considerably lower. Its tyre-engaging surface may be lined or not with fabric.

The pad 38 of Figs. 5 through 7 also of rubber or other resilient material is supported by a back plate or tray 39 and intended more particularly for repairing tyre covers at the angular junction between the tread and one side wall of the cover. Its general shape may be substantially similar to that of any one of the preceding designs but in its inoperative condition the outer face of the pad has a substantially V-section and is lined with a layer 40 of flexible but practically non-extensible material such as textile fabric or wire gauze, or a network of juxtaposed cords, as utilized in the manufacture of tyre covers. Moreover, the pad is formed with a central cavity 41 so as to provide in the vicinity of the vertex of its V-shaped bearing surface a zone of minor resistance or greater compressibility. The cavity 41 illustrated in thick lines may be replaced by one of the longitudinal lower or upper grooves shown in dash lines at 42 and 43 (Fig. 6).

Figure 6 shows at 44 one portion of a tyre cover to be repaired at the junction between its tread and one of its side walls. During the clamping operation the shape of the assembly gradually changes from that shown in Fig. 6 to that shown in Fig. 7; in other words, the corner usually formed at the aforesaid junction between the tread and the side wall of the tyre cover engages the vertex of the hollow V formed in the pad 38 and exerts a greater pressure in this region, so that the pad finally takes the exact shape of the tyre cover portion concerned, the cavity 41 undergoing a more or less pronounced deformation during this clamping action. This change in shape is promoted by the provision of the non-extensible fabric or like lining 40 which can only close to form a sharper angle under the clamping pressure, thereby reducing the angle V of the tyre-engaging face of the pad 38.

Figs. 10, 11 and 12 illustrate a clamping tray suitable for adapting the outfit to the vulcanization of inner tubes equipped with a rubber-based valve. To this end a metal tray 53 formed with a radial notch 54 extending from the tray axis to its periphery is mounted on the rod 14, this notch being adapted to receive straight or bent valve bodies. The upper face of the tray 53 has fitted within its raised peripheral edge 55 a metal washer 56 acting as a bearing member to a compressible resilient pad 57 formed with an axial hole 58. The washer 56 prevents the pad 57 from penetrating into the notch 54 in the tray 53. The upper concave face of the pad is lined with a fabric sheet 59; the shape of this upper face of the pad corresponds to that of the lower face of the heating head 26 and it will be readily understood that the shape of this upper face may differ from the concave one illustrated; thus a flat or other shape may be used. In plane view, the pad may have a round, oval or polygonal shape. Its lower face is formed with a cavity 60 surrounding the axial hole 58, for example of frusto-conical or equivalent form, with a depth gradually increasing from the periphery to the cavity or axial hole. This cavity enables the pad to yield under the clamping pressure so as to take the shape of the valve base.

In the above-described example the cavity 60 is formed in the lower face of the pad 57, but it may be pointed out that if desired this cavity 60 may be formed in either of the pad faces, the result being the same in either case.

The reference numeral 61 in Fig. 11 designates the walls of the inner tube, 62 being the valve base and 63 the valve body adapted to fit in the notch 54. The valve body 63 illustrated in thick lines is of the straight type, but it is also possible to vulcanize a valve having a bent-type body engaging the radial notch 54, this body being shown in dash-and-dot lines at 64.

A fresh valve provided with a rubber base can be vulcanized on an inner tube by simply forming a hole of a few millimeters in the tube wall, gluing the valve base at this place by using a rubber solution and subsequently vulcanizing the assembly on the press with the assistance of the device of this invention. To this end, the tray 53 is positioned on the apparatus; then, on the valve fitting on the inner tube there are disposed in succession the pad 57 of rubber or equivalent material, the metal washer 56, and the fabric lining 59 of pad 57 on the side registering with the valve base 62, the washer 56 being disposed on the inside. The assembly thus obtained comprising the inner tube, the valve, the rubber pad 57 and the washer 56 is then positioned on the tray 53, whereafter the apparatus is clamped and the vulcanizing step effected as in conventional vulcanizing operations.

It will be noted that the lower central cavity 60 in the pad 57 enables the latter to absorb the differences in shape of the valve bases and to regularly distribute the clamping pressure of the vulcanizing outfit throughout the base of the valve to be secured, so that perfect and safe repairs can be obtained.

It will also be understood that the typical embodiment illustrated in the attached drawings and described hereinabove should not be construed as limiting the purposes of the invention as many modifications may be brought thereto without departing from the spirit and scope of the invention as set forth in the appended claim.

I claim:

An apparatus for vulcanizing convex articles comprising a goose-neck having opposing spaced ends, a heating head mounted on one end of said goose-neck, a movable support mounted on the other end of said goose-neck for being moved to and from said heating head, a clamping pad mounted on said support for cooperating with said heating head in clamping articles to be vulcanized therebetween, said pad consisting of a molded mass of compressable, resilient, rubber-like material having concave front face positioned for contacting said articles and a centrally located inner cavity adjacent the apex of said front face and a flexible but substantially non-extensible fabric layer bonded to said compressable resilient pad front face for causing the edge portions of said pad to be strongly pressed against an article to be vulcanized, having a projecting part positioned against the central more compressable part of said pad front face material having an inner cavity and lined on its face contacting said articles with a flexible but substantially non-extensible fabric layer which automatically causes said pad to conform to the article thereon when said article presses said pad in the region of said cavity during the clamping of the same.

References Cited in the file of this patent

UNITED STATES PATENTS 2,426,767 Dupont Sept. 2, 1947